T. S. KEMBLE.
MEANS FOR CONTROLLING LUBRICATION OF ENGINES.
APPLICATION FILED MAY 1, 1920.

1,388,345.

Patented Aug. 23, 1921.

Inventor
Thomas S. Kemble
by Thurston, King & Hudson

UNITED STATES PATENT OFFICE.

THOMAS S. KEMBLE, OF CLEVELAND, OHIO.

MEANS FOR CONTROLLING LUBRICATION OF ENGINES.

1,388,345.  Specification of Letters Patent.  Patented Aug. 23, 1921.

Application filed May 1, 1920. Serial No. 378,147.

*To all whom it may concern:*

Be it known that I, THOMAS S. KEMBLE, a citizen of the United States, residing at Cleveland, in the county of Cuyahoga and State of Ohio, have invented a certain new and useful Improvement in Means for Controlling Lubrication of Engines, of which the following is a full, clear, and exact description.

Internal combustion engines which are designed to run at high speeds or with heavy unit bearing pressures present great difficulties in the matter of providing satisfactory lubrication.

It is customary under such conditions to force oil through the bearings, flooding them, to insure proper lubrication. As the oil works out of the bearings it is carried by centrifugal force along the surface of the crank shaft to the part of the crank arms farthest from the shaft axis. When it reaches this part it is detached from the crank arms by centrifugal force and thrown tangentially in a plane or planes perpendicular to the axis of the shaft. This applies to a large portion of the oil from both crank shaft journals and crank pins. Much of the oil thrown off in this manner is thrown directly into the cylinder and in far greater quantity than required for cylinder lubrication. As a result an excess of oil gets past the piston into the combustion chamber, fouling the spark plugs and causing other troubles by excessive carbon deposit.

The present invention is directed to the provision of simple means for controlling the direction of flow of the oil after it leaves the bearings so that the bearings can be flooded without causing an excess of oil to reach the combustion chamber. By the use of this simple means the oil is caused to be thrown off from each crank arm in a plane which is normal to the axis of the crank shaft and may be selected so as to control the discharge of oil from the crank shaft arms and prevent an excess of oil reaching the cylinders.

Figure 1:
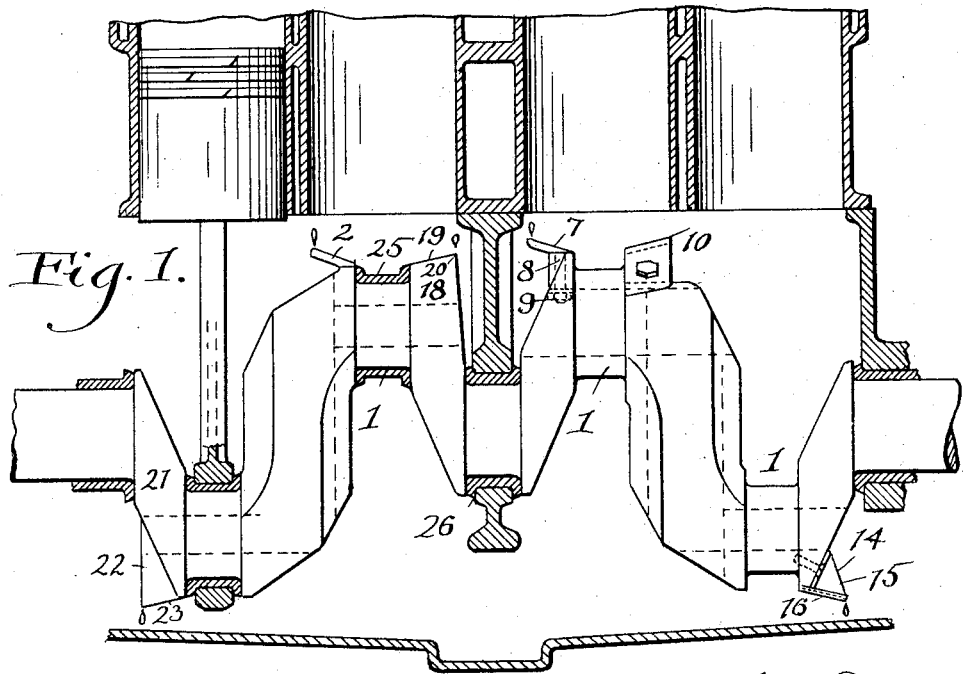
Figure 2:
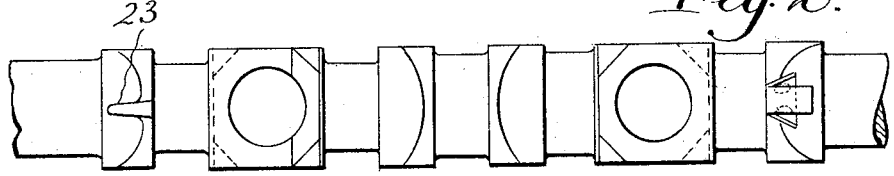
Figure 3:
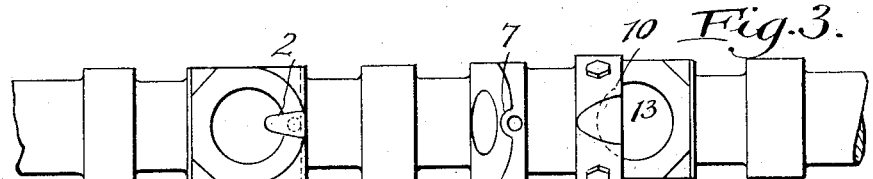
Figure 4:
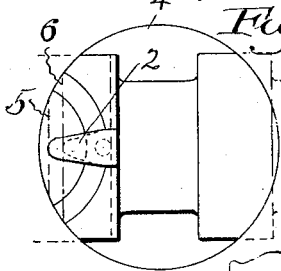
Figure 6:
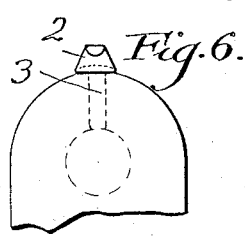
Figure 5:
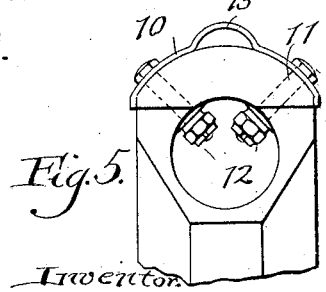
Figure 7:
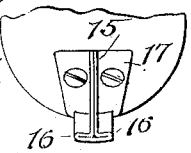

Reference should be had to the accompanying drawings forming a part of this specification in which Figure 1 is a sectional elevation showing portions of an internal combustion engine; Fig. 2 is a bottom plan view of the crank shaft; Fig. 3 is a top plan view of the crank shaft; Fig. 4 is a plan view showing the lower edge of a cylinder in its relation to the crank shaft; Fig. 5 is a sectional elevation showing a device which may be used in carrying out the invention; Fig. 6 is an elevation showing another form of device; Fig. 7 is an elevation showing another form of device.

In the drawing there is illustrated rather conventionally an engine having four cylinders and a crank shaft mounted beneath the cylinders and in proper relation thereto, all of which typifies a construction which is very well known in the art.

The crank shaft shown may be of any desired type, and in the present instance the crank shaft is a four-throw crank shaft which is mounted in bearings at its end, and at a central or intermediate bearing. In crank shafts employed for high speed engines it is necessary to provide some form of force feed lubrication which will carry the oil under pressure to the crank pins which are indicated at 1 in the drawings.

So far as the present invention is concerned, it is immaterial what form of force feed lubrication is used, and in order to supply the high duty bearings with a sufficient amount of oil to insure proper lubrication, it is practically necessary to provide some system which will flood the bearings.

As will be noticed by reference to Fig. 1 of the drawings, the arms of the crank shaft which connect with the crank pins are in line with the openings at the lower ends of the cylinders, and under ordinary conditions, if the bearings be flooded, the oil flowing out around the ends of the bearings, will flow upon the arms of the crank shaft, and as the crank shaft rotates the centrifugal action will discharge the lubricant and will discharge it in large quantities into the cylinders themselves, and the amount of oil which would thus be conveyed, under ordinary circumstances, to the cylinders, would be far in excess of the amount required for lubrication of the cylinders, and hence there would be an excessive amount of carbonization.

The present invention aims to so control the discharge of oil from the crank shaft due to the centrifugal action of the oil as the shaft rotates, that the major portion of the oil will be discharged against the walls of the crank case, and only a sufficient amount of oil be discharged into the cylinders, as is necessary for proper and effective lubrication.

The crank shaft which is shown in the drawings, shows a number of constructions which may be employed to accomplish the desired results.

At 2 in Fig. 1 there is shown a device which has an upwardly slanting surface, that is to say it is outwardly slanting with respect to the axis of the crank shaft. This device is again shown in Fig. 6, and as will be seen the side walls of the device are also slanting. This device is secured to the crank shaft by drilling a hole into the crank shaft and providing the device 2 with a pin 3 which is preferably formed integral therewith, which pin is of such a size as to have a driving fit or otherwise secured in the opening in the crank shaft arm.

The oil which flows out around the end of the crank pin which is adjacent to the device 2 and around the end of the crank shaft journal which is adjacent to the device 2 will be directed outwardly along the device 2 because the centrifugal force of the rotating crank shaft will facilitate the passage of the oil along the device 2, and to increase and assist in this action the surfaces, or at least the outer surfaces of the device 2, are slanting. The end of the device 2, as will be seen, lies adjacent the extreme portion of the cylinder, and consequently as the device 2 rotates with the crank shaft the amount of oil which is discharged into the cylinder will be proportional to the length of the line of intersection between the plane of rotation of the device 2 and the plane formed by the open end of the cylinder. This may be more readily understood from an inspection of Fig. 4, wherein the device 2 is shown as beneath a cylinder, the lower edge of which is represented at 4. The end of the device 2 traverses, with respect to the lower edge of the cylinder, a path represented by the dotted line 5, and hence oil is discharged into the cylinder only during the time when the device 2 is discharging upon the line 5. If it be desired to discharge a greater amount of oil into the cylinder, the length of the device 2 may be shortened so that the end of the device 2 would traverse a line 6 when passing beneath the cylinder 4. This would then cause the delivery of a greater amount of oil to the cylinder 4 as the crank shaft rotated.

From the foregoing it will be seen that by positioning the device 2, the amount of oil discharged into the cylinder beneath which the device rotates may be controlled, and very accurately controlled. The excess oil discharged from the device 2, which is not delivered to the cylinder, is, of course, thrown against the wall of the crank casing. The oil which is thus discharged against the walls of the crank casing will run to the bottom of the crank casing, and may be pumped out of the casing and re-supplied to the bearings by the employment of any suitable system.

In the drawings, more particularly Fig. 1, I have shown another form of device indicated at 7, which in all essential particulars is the same as the device 2, with the exception that the pin indicated at 8 which extends through an opening in the crank shaft, extends upon the inside of a hollow arm of the crank shaft and is secured by means of a nut 9.

In the drawings, at 10 there is shown a form which may, if desired, be made of sheet metal. It is made so that portions extend over the width of the arm of the crank shaft with which it is associated, and it is secured to the crank shaft by means of bolts 11 which pass through openings in the crank shaft, and these bolts receive nuts 12 which are upon the inside of the crank shaft.

The device 10 is at the portion thereof which is adjacent the central portion of the width of the arm with which it coöperates, provided with a raised and rounding surface portion 13. This surface has a general slant which is similar in purpose and function to the slant of the device 2, that is to say, for the purpose of assisting the oil in its discharge under centrifugal action. In this form of device the oil may run inside of the raised portion 13, or upon the outside thereof. Obviously, other means of securing the device 10 may be employed than the bolts 11 which are shown.

At 14 there is shown another form of device which may be employed. This is preferably made of sheet metal and is so folded that there is a central rib 15, and outwardly extending flanges 16 which lie upon opposite sides of the rib 15. The device has flanges at the base thereof such as indicated at 17, at which portion it is secured to the arm of the crank shaft. This device is so fashioned with respect to the crank shaft that the flanges 17 lie in a slanting plane with respect to the axis of the crank shaft, and the oil which works around the crank pin adjacent to which it may be secured will work out upon the flanges 16 and be discharged from the end portion thereof in the same fashion which has heretofore been described.

The invention may be carried out not only by providing separate devices which may be attached to the crank shaft, but may also be carried out by giving a particular formation to those portions of the crank shaft from which the oil may be discharged by centrifugal force. For instance, as shown in Fig. 1, the crank arm 18 is provided at its extremity with a slanting surface 19, and the cheek of the crank shaft is so fashioned as to provide a point or edge 20 from which the oil may be discharged as the crank shaft rotates. The positioning of this edge or point 20 is determined in precisely the fashion explained with respect to the showing in Fig. 4.

Another modification which may be given to the crank shaft is indicated in Fig. 1, wherein the arm 21 is provided with an outstanding rib 22, the end surface of which, as indicated at 23, is slanting so that oil coming from the crank pin bearing adjacent thereto may work along the surface 23 and be discharged at the end thereof. The discharge point for the flange 22 may be so selected as to deliver to the cylinder with which it is associated only the quantity of oil which it is desired to deliver thereto.

Attention is called to the fact that the collar 24 on the crank pin has the edges of the side flanges provided with surfaces which extend outwardly with respect to the axis of the crank pin. This construction serves to assist the flow of oil toward the arms of the crank shaft and away from the connecting rod which is mounted on the crank pin.

Likewise the collars such as 26 which are located at the main bearing supports of the crank shaft have the edges of the flanges of the collar slanting in a direction which is away from the crank arms, thus directing the flow of oil toward the walls or web which support the main shaft bearings.

Having described my invention, I claim—

1. In an engine the combination with a cylinder, piston, connecting rod and crank shaft, bearings associated with the crank shaft, means for supplying lubricant to said bearings, of means on the crank shaft for centrifugally discharging oil escaping from the bearings in predetermined relationship to the open end of the cylinder.

2. In an engine the combination with a cylinder, piston, connecting rod and crank shaft, bearings associated with the crank shaft, means for supplying lubricant to said bearings, of means on a crank shaft arm for centrifugally discharging oil escaping from the bearings in predetermined relationship to the open end of the cylinder.

3. In an engine the combination with a cylinder, piston, connecting rod and crank shaft, bearings associated with the crank shaft, means for supplying lubricant to said bearings, of means on a crank shaft arm for centrifugally discharging oil escaping from the bearings in predetermined relationship to the open end of the cylinder, said means having a slanting surface thereby to facilitate the movement of oil under centrifugal action.

4. In an engine the combination with a cylinder, piston, connecting rod and crank shaft, bearings associated with the crank shaft, means for supplying lubricant to said bearings, of means on the crank shaft for centrifugally discharging oil escaping from the bearings, said means having a surface which extends away from the crank pin and toward the edge of the cylinder thereby to discharge oil in predetermined relationship to the open end of the cylinder.

5. In an engine the combination with a cylinder, piston, connecting rod and crank shaft, bearings associated with the crank shaft, means for suplying lubricant to said bearings, of a device adapted to be attached to the crank shaft and conduct oil escaping from the bearings away from the said arm and centrifugally discharge said escaping oil in predetermined relationship to the open end of the cylinder.

6. In an engine the combination with a cylinder, piston, connecting rod and crank shaft, bearings associated with the crank shaft, means for supplying lubricant to said bearings, of a device attached to the crank shaft, said device having a part with a slanting surface and positioned to centrifugally discharge oil escaping from the bearings in predetermined relationship to the open end of the cylinder.

7. In an engine the combination with a cylinder, piston, connecting rod and crank shaft, bearings associated with the crank shaft, means for supplying lubricant to said bearings, of a device secured to the crank shaft at the end of an arm of the crank shaft, said device having a portion with a slanting surface which extends away from the said arm and positioned so that oil escaping from the bearings is centrifugally discharged in predetermined relationship to the open end of the cylinder.

In testimony whereof, I hereunto affix my signature.

THOMAS S. KEMBLE.